United States Patent
Abraham et al.

(10) Patent No.: US 8,932,745 B2
(45) Date of Patent: Jan. 13, 2015

(54) METHOD FOR CONNECTING CELL OUTGOING CONDUCTORS AND BATTERY ARRANGEMENT

(75) Inventors: Simon Abraham, Berlin (DE); Nevzat Guener, Berlin (DE); Hans-Georg Schweiger, Ingolstadt (DE); Stefan Tillmann, Berlin (DE)

(73) Assignee: Continental Automotive GmbH, Hannover (DE)

( * ) Notice: Subject to any disclaimer, the term of this patent is extended or adjusted under 35 U.S.C. 154(b) by 15 days.

(21) Appl. No.: 13/516,788

(22) PCT Filed: Nov. 17, 2010

(86) PCT No.: PCT/EP2010/067693
§ 371 (c)(1),
(2), (4) Date: Jul. 17, 2012

(87) PCT Pub. No.: WO2011/072974
PCT Pub. Date: Jun. 23, 2011

(65) Prior Publication Data
US 2012/0276773 A1 Nov. 1, 2012

(30) Foreign Application Priority Data
Dec. 18, 2009 (DE) .......... 10 2009 058 883

(51) Int. Cl.
*H01M 10/38* (2006.01)
*H01M 6/42* (2006.01)
*H01M 4/82* (2006.01)
*H01M 2/20* (2006.01)
*H01M 2/02* (2006.01)

(52) U.S. Cl.
CPC ........... *H01M 2/202* (2013.01); *H01M 2/0275* (2013.01); *H01M 2/0212* (2013.01); *H01M 2/021* (2013.01)
USPC ............... 429/123; 429/149; 29/623.1

(58) Field of Classification Search
USPC .................. 29/623.1; 429/123, 149
See application file for complete search history.

(56) References Cited

U.S. PATENT DOCUMENTS

| | | | |
|---|---|---|---|
| 5,849,431 A * | 12/1998 | Kita et al. | 429/164 |
| 7,504,179 B2 | 3/2009 | Tanjou et al. | |
| 8,142,523 B2 | 3/2012 | Cyr et al. | |
| 8,193,770 B2 | 6/2012 | Zheng et al. | |

(Continued)

FOREIGN PATENT DOCUMENTS

| CN | 101315990 A | | 12/2008 | |
|---|---|---|---|---|
| JP | 2001-325945 | * | 11/2001 | H01M 2/34 |

(Continued)

*Primary Examiner* — Ula C. Ruddock
*Assistant Examiner* — Osei Amponsah
(74) *Attorney, Agent, or Firm* — Laurence A. Greenberg; Werner H. Stemer; Ralph E. Locher

(57) ABSTRACT

A method for connecting cell outgoing conductors of a first and a second cell. Here, a connection between the first and second cell outgoing conductors is produced by means of a connecting apparatus, which includes a first and a second component. At the same time, however, the first and second components also have the function of pre-bending the cell outgoing conductor of the first and second cells, respectively, in order thus to enable a particularly low physical height of the cell outgoing conductor arrangement. A system according to the invention includes a first and a second cell, which have cell outgoing conductors that are connected and shaped in this way.

11 Claims, 5 Drawing Sheets

(56) References Cited

U.S. PATENT DOCUMENTS

Figure 1E:
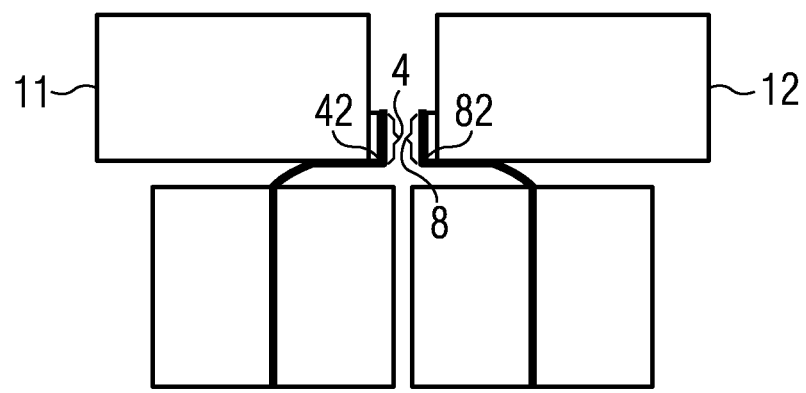
Figure 1F:
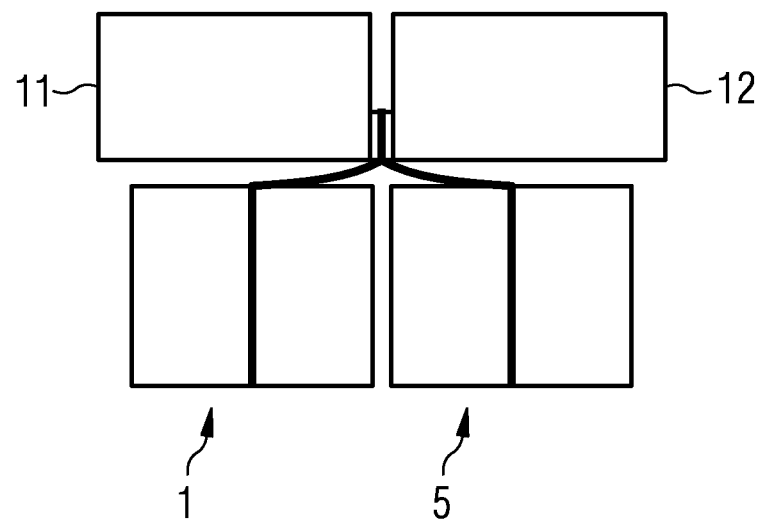
Figure 1G:
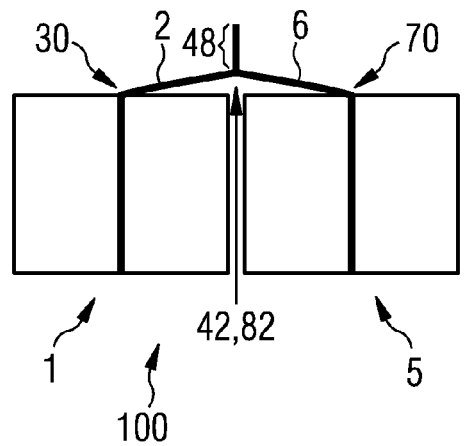

| | | |
|---|---|---|
| 2002/0146620 A1 | 10/2002 | Connell |
| 2008/0070102 A1 | 3/2008 | Watanabe et al. |
| 2010/0104939 A1 | 4/2010 | Wang et al. |

FOREIGN PATENT DOCUMENTS

| | | | | |
|---|---|---|---|---|
| JP | 2001-325945 A | 11/2001 | | |
| JP | 2004178860 A1 | 6/2004 | | |
| JP | 2005-116434 | * 4/2005 | ............. | H01M 2/20 |
| JP | 2005-116434 A | 4/2005 | | |
| JP | 2006-294340 A | 10/2006 | | |
| JP | 2007242376 A | 9/2007 | | |
| JP | 2009519565 A | 5/2009 | | |
| WO | 2006109610 A1 | 10/2006 | | |
| WO | 2008/144994 A1 | 12/2008 | | |
| WO | 2009082957 A1 | 7/2009 | | |

* cited by examiner

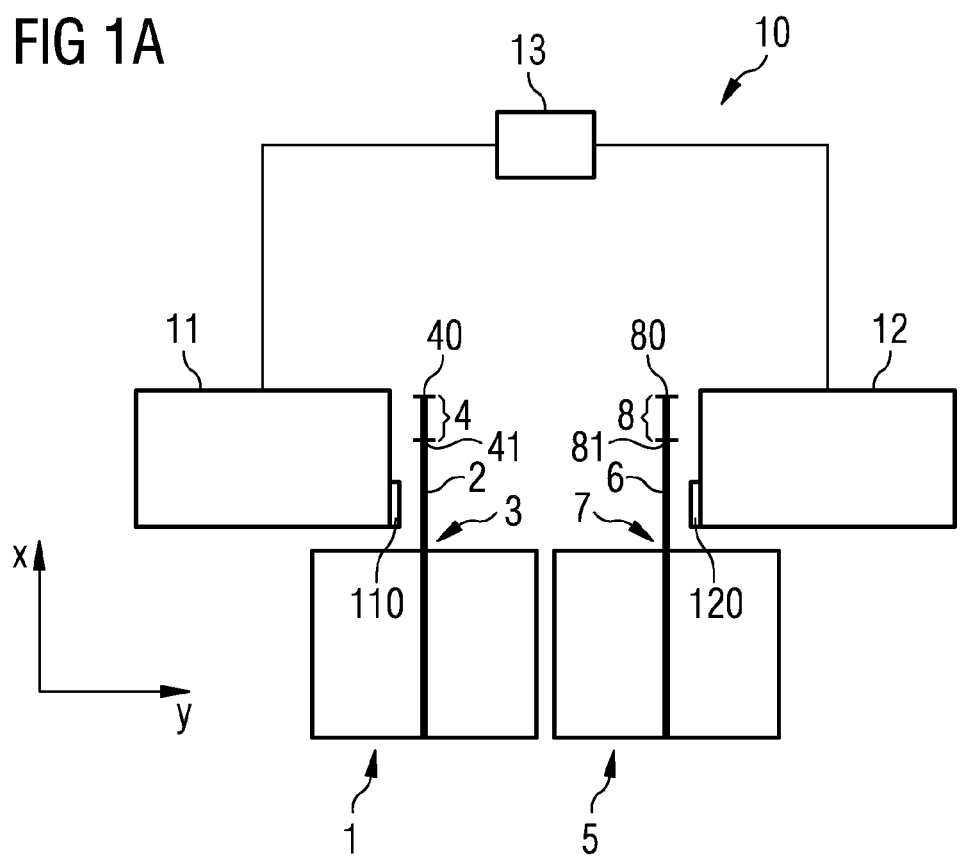
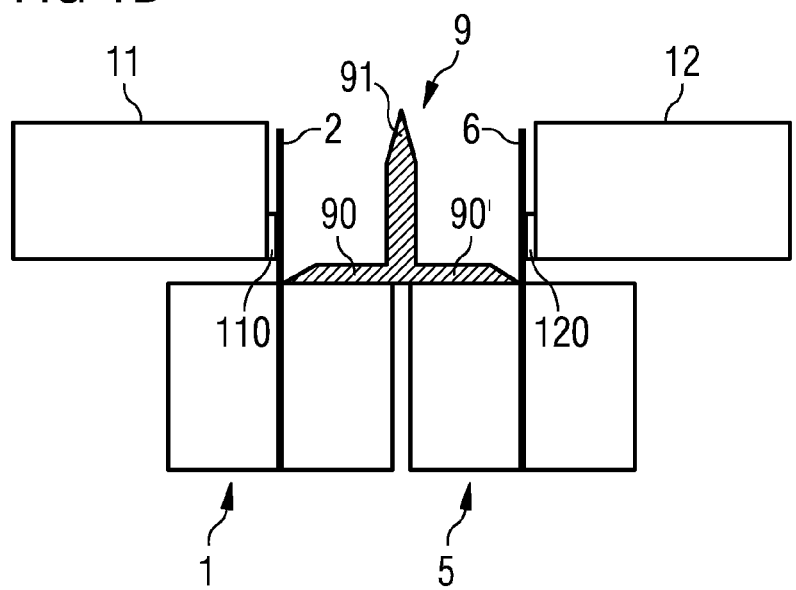

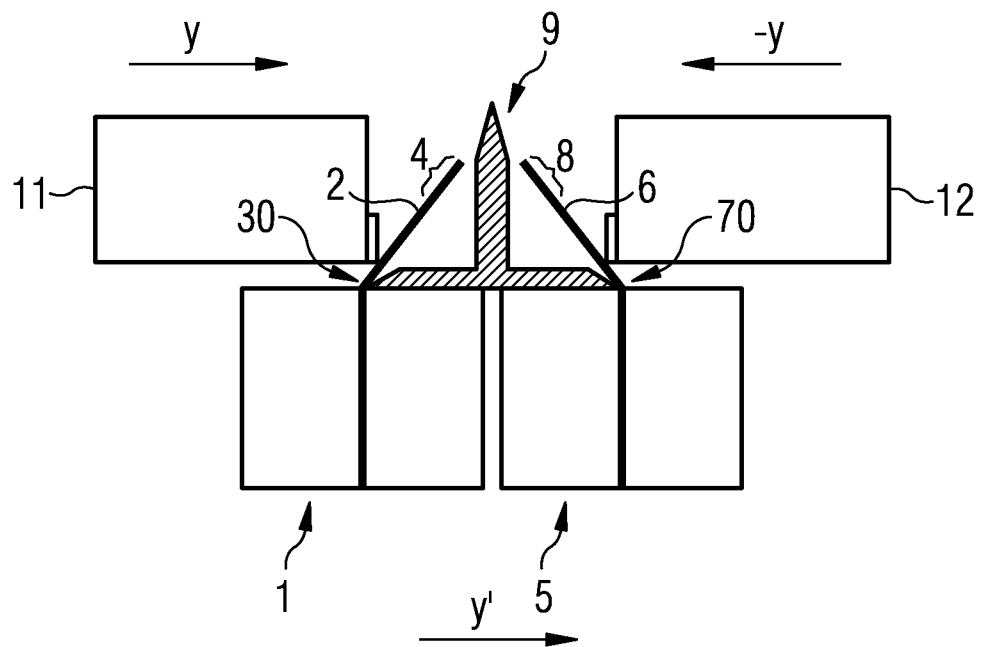
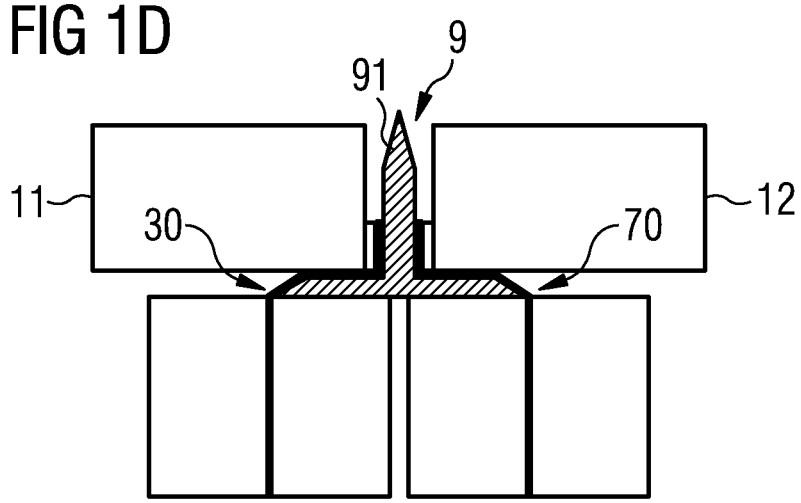

METHOD FOR CONNECTING CELL OUTGOING CONDUCTORS AND BATTERY ARRANGEMENT

BACKGROUND OF THE INVENTION

Field of the invention

The subject of the present invention is a method for connecting cell outgoing conductors as claimed and a system having a first and a second cell, which are mutually connected by way of a first and a second cell outgoing conductor, as claimed.

In order to increase the capacity of batteries, different battery cells or other cells, such as fuel cells, are mutually connected in a row or in series. For this purpose, the cells in the form of a battery, battery cells, fuel cells or similar comprise a cell outgoing conductor that is guided to the outer side of the cell and is used to provide a connection to a further cell. The cell outgoing conductors are often sheet outgoing conductors that comprise, for example, copper or aluminum or an alloy and are up to 1 cm thick.

A material-engagement connection is frequently proposed for mutually connecting the cell outgoing conductors. In this case, the cell outgoing conductors of a first and an adjacent second cell are mutually connected by material engagement by means of an ultrasound welding apparatus. In so doing, the ultrasound welding apparatus comprises an at least fixed anvil, a movable sonotrode and a control unit for performing the ultrasound welding process and for controlling the movement of the sonotrode.

As a result of the dimensions of the ultrasound welding apparatus and/or generally the connecting apparatus, it is necessary either for the cell outgoing conductors to protrude to a great extent out of the cells or the installation height of the system of a first and a second cell is increased, since the anvil is pushed between the first and the second cell and a simple bent cell outgoing conductor and only then is the sonotrode moved onto the anvil for the purpose of mutually connecting the first and the second cell outgoing conductor.

One problem experienced in the case of the abovementioned first solution, in which the anvil is not positioned between the cell and the cell outgoing conductor, is the excess material of the cell outgoing conductor that requires processing in order to achieve an installation height suitable for the product. The same applies for the second solution mentioned, in which the anvil is pushed between the cell and the cell outgoing conductors.

The installation height of systems of this type comprising at least one first and one second cell is of decisive importance in order to be able inter alia to increase the energy density of the battery.

BRIEF SUMMARY OF THE INVENTION

The object of the present invention is to provide a method that does not comprise the aforementioned disadvantages and renders it possible to have a comparatively smaller installation height for a system comprising a first and a second cell having in each case a cell outgoing conductor. It is likewise the object of the invention to provide a system that is characterized by a comparatively small installation height.

The object is achieved by virtue of a method according to the claims and also by virtue of a system as claimed.

The system preferably produced using the method and comprising a first cell having a first cell outgoing conductor that exits at an exit point and a second cell having a second cell outgoing conductor that exits at an exit point can achieve or does achieve a comparatively smaller installation height by virtue of at least two bends in the first and second cell outgoing conductor. In so doing, the first and also the second cell outgoing conductor are mutually connected along a respective end section that is defined by an upper and lower boundary and the end section is located in each case at a region of the respective cell outgoing conductor, which region is remote from the exit point, wherein the lower boundary is in closer proximity to the exit point than the upper boundary. In this case, the bend is located on the one hand in the region of the exit point and on the other hand in the region of the lower boundary of the end section.

For this purpose, the first and the second cells are firstly arranged in such a manner that the first and the second cell outgoing conductor extend along or in the direction of a first axis and are at a mutually spaced disposition.

Subsequently, a first component of a connecting apparatus is positioned against the first cell outgoing conductor in the direction of a second axis that is preferably perpendicular with respect to the first axis. In addition, a second component of the connecting apparatus is positioned against the second cell outgoing conductor, so that the first and the second cell outgoing conductor are positioned, as seen along the second axis, between the first and the second component. In this case, said components can also be placed in position in such a manner that the first and the second cells are moved into a connecting apparatus. Subsequently, the first cell outgoing conductor is pushed in the direction of the second cell outgoing conductor by means of the first component. In other words, the first component of the connecting apparatus is not only responsible for the subsequent production of the connection, it also has a shaping task required for positioning the first cell outgoing conductor. In addition to the pushing action of the first component, the second cell outgoing conductor is pushed in the direction of the first cell outgoing conductor by means of the movement of the second component in the opposite direction to the direction of movement of the first component and/or by means of the movement of the first and the second cell in the direction of the second component. During the movement of the first and second cell in the direction of the second component, that part of the cell outgoing conductor that is partially clamped between the second component and the second cell and protrudes out of the cell is likewise pushed. The active pushing process by means of the second component and the movement of the first and the second cells (or also passive pushing process) in the direction of the second component can occur simultaneously.

The first and the second component now move towards each other and in so doing the first and the second cell outgoing conductor move towards each other, wherein in this case the first and the second cell outgoing conductors bend in each case in the region of the exit point. With regard to this bend, it can in this case also be understood to be a slightly curved bend but also a bend that changes the direction of the cell outgoing conductor in relation to the part of the cell outgoing conductor that is arranged in the cell.

The bend is created by virtue of the fact that the cell outgoing conductor is clamped between the respective cell and the respective components performing the pushing action, it is held in the exit point as a fulcrum and is therefore forced into a rotational movement. It is to be noted from this that the first and the second component and/or the first and second cell do not move so quickly that the first and/or the second cell outgoing conductor fracture in the region of the exit point. This can be avoided in an advantageous manner by virtue of the fact that a flat cell outgoing conductor is used.

Once the first and the second component have moved the first and the second cell outgoing conductor towards each other, the end sections press against each other between the first and the second component. In this case, a surface connection of the end sections of the first and the second cell outgoing conductor is preferably created in the section between the upper and the lower boundary. The connection is advantageously a material-engagement connection, wherein the end sections between the first and the second component are acted upon by an energy (thermal energy, friction energy) that eventually creates the connection and/or the material-engagement connection.

As a result of the dimensions of the end sections and the first and the second component, a further bend is performed in the region of the respective lower boundary shortly before or whilst the first bend is being performed. Consequently, the system comprising the first and the second cell and the cell outgoing conductor comprises both on the first and also on the second cell outgoing conductor in each case a bend in the region of the exit point and also a bend in the region of the lower boundary.

As disclosed in the aforementioned sections, the connecting apparatus, in particular the first and the second component, is used on the one hand to position the first and the second cell outgoing conductor, i.e. for moving the cell outgoing conductors towards each other and simultaneously to produce the connection. The connection is created inter alia by virtue of the fact that the first component is embodied in such a manner as to be able to move and either the second component is likewise either embodied in such a manner as to be able to move and/or the first and the second cell can be moved in the direction of the second component.

This is clearly evident in an example. The first component moves at a rate $V_1$ in the y-direction. On the one hand, the second component is now able to move at the rate $V_1$ in the negative y-direction or, on the other hand, the first and the second cell can move at a rate of $0.5 \times V_1$ likewise in the y-direction. This would produce a relative rate of movement between the cells and the first component of 0.5 $V_1$ in the y-direction and of the second component of 0.5 $V_1$ in the negative y-direction. Since the first and the second axis extend in different directions, the first and the second component having a component viewed laterally in the direction of the cell outgoing conductor are moved towards the cell outgoing conductor and continue to move towards each other and are pressed against each other until a connection is created between the first and the second cell outgoing conductor.

Consequently, it is no longer necessary to position the anvil between the battery and the cell outgoing conductor. However, the first and the second cell likewise perform a function, since these retain the cell outgoing conductor and consequently define the fulcrum point and/or rotational point for bending the cell outgoing conductor in the region of the exit point.

It is possible using the aforementioned method to provide, in particular, flat systems comprising a first and a second cell having in each case a first and second cell outgoing conductor, wherein the first and the second cell outgoing conductor comprise in each case two bends.

Further embodiments are described in the subordinate claims. In a first embodiment, the second axis extends in a horizontal direction and/or comprises a horizontal component. This has inter alia the advantage that the batteries can be placed on the floor and can be moved, for example, using a conveyor belt or the first and second component move towards each other preferably in parallel with respect to the horizontal.

In a further embodiment, as already mentioned, the connection is a material-engagement connection. The material-engagement connection can be produced, for example, by means of welding to the cell outgoing conductor or by means of mechanical friction of the cell outgoing conductor. One method in which the first and the second cell outgoing conductor are connected by means of mechanical friction is the ultrasound welding method. In this case, the connecting apparatus is an ultrasound welding apparatus, wherein the first component comprises a sonotrode and the second component an anvil and the entire end section of the respective first and second cell outgoing conductor can be positioned between said components. In so doing, the lower boundary forms, for example, the lower edge of the first and second component.

In a further embodiment, a bending aid is positioned between the first and second cell outgoing conductor prior to said cell outgoing conductor being connected. The bending aid is used to achieve an improved bend in the region of the exit point and a pre-shaping of the bend in the region of the end sections prior to actually mutually connecting the sections. As a consequence, on the one hand the geometric shape of the bends is pre-determined, so that during the subsequent connecting process the two end sections are already aligned in parallel with each other. The bending aid can, for example, be embodied in the shape of a bar or be T-shaped.

In a further embodiment, the mutually connected end sections of the first and the second cell outgoing conductors are subsequently folded again along the lower boundary. As a consequence, a further reduction in the installation height is achieved.

In a further embodiment, the first and the second cell outgoing conductor are, in addition, covered by a cover, which can have a protective function on the one hand and on the other hand can have an additional task of reducing the installation height.

The invention is explained in detail hereinunder with reference to an exemplary embodiment, in which:

BRIEF DESCRIPTON OF THE SEVERAL VIEWS OF THE DRAWING

Figure 2:
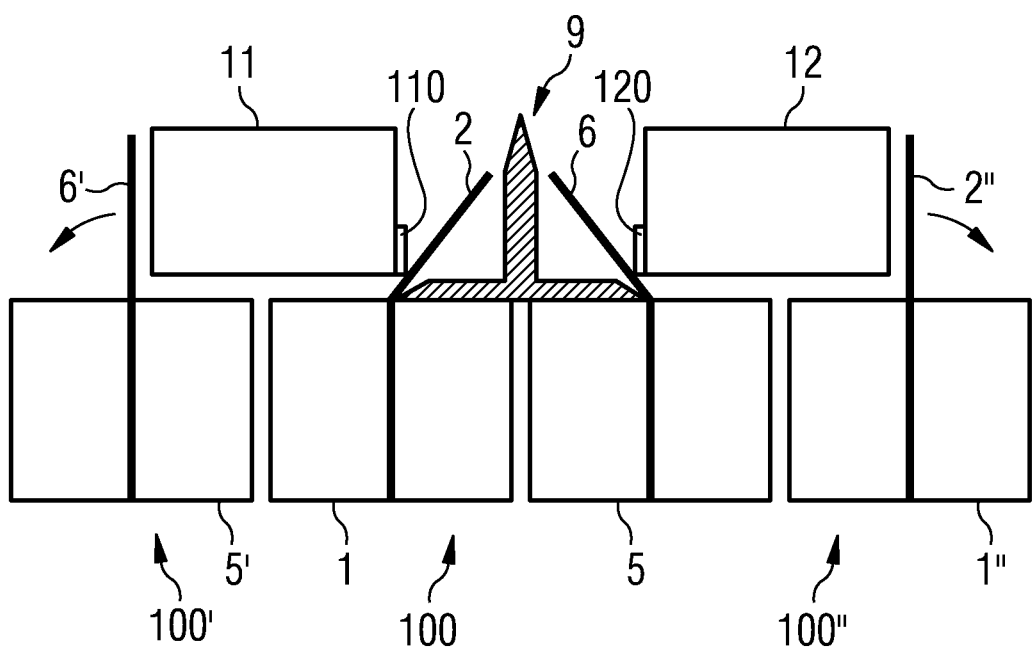

FIG. 1a-i shows a schematic diagram of an exemplary process flow of an embodiment of the method in accordance with the invention;

FIG. 2 shows an embodiment of a system having more than two cells.

DESCRIPTION OF THE INVENTION

FIG. 1a illustrates a first cell 1, which is a battery cell and comprises a cell outgoing conductor 2 embodied as a metallic sheet outgoing conductor. The cell outgoing conductor 2 exits the first cell 1 at the exit point 3. The end section 4 is located on the upper end, as seen in the x-direction, of the cell outgoing conductor 2, which end section is defined by the upper boundary 40 and the lower boundary 41. In so doing, the lower boundary 41 is closer to the exit point 3. A second cell 5 is illustrated in a similar manner to the first cell 1, which second cell is likewise a battery cell. This likewise comprises a second cell outgoing conductor 6, which exits the second cell 5 at an exit point 7. The end section 8 comprises an upper boundary 80, which is symmetrical to the end section 4, and a lower boundary 81. It is possible to use, for example, flat cells in aluminum composite sheets (pouch cells) having flat cell outgoing conductors (TABS) produced from aluminum and optionally nickel-plated copper. Generally, batteries such as lithium-ion, NiCd, NiMH, lead, nickel/zinc, zinc/air, lithium/air and aluminum batteries can be used, but also supercaps and fuel cells.

The first cell outgoing conductor 2 and the second cell outgoing conductor 6 extend along a first axis, which is in parallel with respect to the x-axis. In addition, they are at a mutually spaced disposition along a second axis, which is defined by the y-axis.

A first component 11 of a connecting apparatus 10 is arranged on the left-hand side of the first cell outgoing conductor 2. In a similar manner thereto, a second component 12 of the connecting apparatus is located on the right-hand side of the second cell outgoing conductor 6. Both the first component 11 and also the second component 12 can be moved towards each other along the second axis that lies in the y-direction. In so doing, the movement is controlled by means of the control unit 13, which comprises a microprocessor control unit.

In the case of the illustrated connecting apparatus, the apparatus is an ultrasound welding device. In so doing, the first component 11 comprises a sonotrode 110, which, when seen in the x-direction, is located on the lower edge of the first component 11. An anvil 120 that is allocated to the second component 12 is located at the same height level when seen in the x-direction.

It is evident that the sonotrode 110 and the anvil 120 are positioned well below the lower boundary 41 and/or 81 of the end section of the respective cell outgoing conductor 2 and/or 6. It is only after the pushing process illustrated in the following figures that the end regions 4 and/or 8 move into the region of the sonotrode 110 and/or of the anvil 120 and are mutually connected after the subsequent reshaping.

FIG. 1b illustrates that a positioning aid 9 is introduced between the first cell outgoing conductor 2 and the second cell outgoing conductor 6. This aid is T-shaped, wherein the bar 90 and/or 90' lies on the upper face of the first cell 1 and/or the second cell 5 and a middle bar 91 extends in the x-direction. In addition, it is clearly evident that the first component 11 and the second component 12 have moved closer to the first and the second cell outgoing conductor respectively and in each case are now in contact therewith.

Subsequently, the first component 11 and the second component 12 are moved closer to each other when seen in the y-direction. This is illustrated in FIG. 1c. As a result of the movement of the first component 11 in the y-direction and the movement of the second component 12 in the negative y-direction, direction, the first cell outgoing conductor 2 and/or the second cell outgoing conductor 6 are bent in the region of the respective exit point. The bend is provided for the first cell outgoing conductor 2 with the reference numeral 30 and for the second cell outgoing conductor 6 with the reference numeral 70.

The bend is created since the lower edge of the first and/or the second component is moved without deviation in the x-direction along the y-direction and the cell outgoing conductor 2 and/or 6 can only retain its shape between the end section and the exit point by virtue of the bend in the region of the exit point.

The shaping of the bend is supported by the bending aid 9. The bending aid 9 is used to create, in particular, a desired geometric shape of the curved bend 30 and/or 70.

Subsequent to the situation illustrated in FIG. 1c, the first component 11 and the second component 12 are moved towards each other until the end sections 4 and 8 lie against the middle bar 91 of the bending aid 9. This is illustrated in FIG. 1d. In so doing, however, it is to be noted that the end sections 4 and/or 8 are not moved tightly up against the bending aid 9 in such a manner that the bending aid 9 can no longer be removed.

FIG. 1e illustrates the instant in which the bending aid 9 is removed - for example by drawing it out perpendicularly to the plane of the figure. It is clearly evident that a further bend 42 and/or 82 is provided on the lower boundary of the end section 4 and/or 8 in addition to the bend 30 and/or 70.

Subsequently, the first component 11 and the second component 12 are moved even closer towards each other until the two respective end sections of the first and the second cell outgoing conductor are in contact with each other. As soon as they are in contact with each other, the sonotrode 110 is influenced by energy and mechanical friction creates a material-engagement connection between the first and the second cell outgoing conductor. This method step is clearly evident in FIG. 1f.

The system 100 produced by means of the method described above is illustrated in FIG. 1g. The system 100 comprises the first cell 1 and the second cell 5 and also the first cell outgoing conductor 2 and the second cell outgoing conductor 6, wherein the first cell outgoing conductor 2 comprises a first bend 30 and a second bend 42. The second cell outgoing conductor 6 comprises a first bend 70 and a second bend 82. The end sections 4 and 8 that are visible in the FIGS. 1a-e are connected to a common connection 48.

Figure 1H:
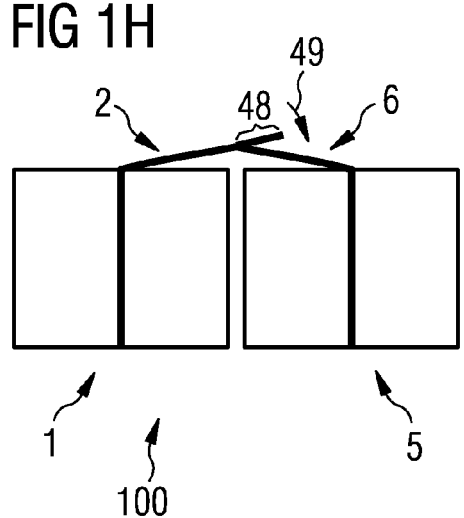
Figure 1I:
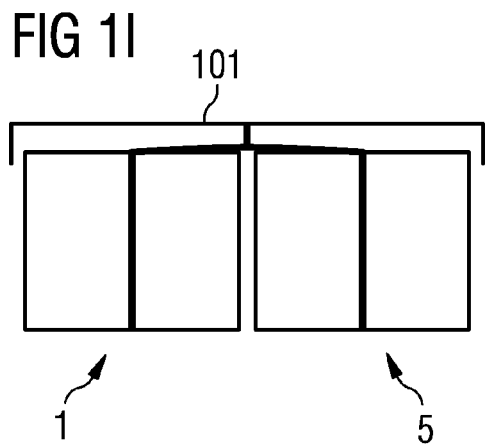

In order to further reduce the installation height, as illustrated in FIG. 1h, the connection 48 can be bent over by virtue of a further fold 49. In this case, the fold 49 is a rotational movement indicated in the clockwise direction from the x-axis in the direction of the y-axis.

A further alternative for reducing the installation height can be performed by means of a cover 101 that presses on the connection 48 and consequently pushes the entire construction of the first and second cell outgoing conductor 2 and/or 6 further downwards, which construction is located between the exit points. Naturally, the features evident in FIGS. 1h and 1i can be combined with each other, i.e. a fold 49 can first be performed and only then are the mutually connected cell outgoing conductors covered by a cover 101.

It is therefore possible by means of the method described in FIGS. 1a-i to produce particularly flat, mutually connected sheet outgoing conductors and/or cell outgoing conductors.

With reference to FIG. 2, it is intended to illustrate that the method is also suitable for mutually connecting more than only one first and one second cell that form a system 100.

For this purpose, a left-hand and a right-hand neighbor 100' and/or 100" to the system 100 are illustrated, wherein the system 100' and the system 100" are not illustrated in full. The system 100' is not illustrated in full and only its second cell comprising the second cell outgoing conductor 6' is illustrated. If a method as described in FIGS. 1a-i is applied, said second cell outgoing conductor is bent over in the anti-clockwise direction and connected to the first cell, not illustrated, of the system 100'. Similarly thereto, the first cell outgoing conductor 2" of the first cell 1" of the system 100" is bent over in the clockwise direction. A connection between the first cell 1 and the second cell 5' is performed by means of a cell outgoing conductor that has been embodied separately from the first cell outgoing conductor 2 and/or the second cell outgoing conductor 6', which separately embodied cell outgoing conductor would lie in the drawing plane behind the illustrated cell outgoing conductors 2 and/or 6'. The same applies for the connection between the second cell 5 and the first cell 1".

With the aid of the method in accordance with the invention and the system in accordance with the invention and/or their variants, the cells can be mutually connected in series and also in parallel depending upon whether poles of the individual cells are mutual connected. In the case of a system, which comprises more than two cells, blocks of respective parallel, mutually connected cells are mutually connected in series. As a consequence, a desired capacity or voltage can be achieved in accordance with the calculation rules for voltage sources.

The number of cells mutually connected in series and/or in parallel in one system can amount to between two and a hundred and/or a thousand cells. A system having, for example, several thousand parallel-connected cells is inter alia relevant for use in stationary applications.

| List of reference numerals | |
|---|---|
| 1, 1" | First cell |
| 2, 2" | First cell outgoing conductor |
| 3 | Exit point |
| 4 | End section |
| 5, 5' | Second cell |
| 6, 6' | Second cell outgoing conductor |
| 7 | Exit point |
| 8 | End section |
| 9 | Bending aid |
| 10 | Connecting apparatus |
| 11 | First component |
| 12 | Second component |
| 13 | Control unit |
| 30, 70, 42, 82 | Bend |
| 40, 80 | Upper boundary |
| 41, 81 | Lower boundary |
| 90, 90', 91 | Bars |
| 100, 100', 100" | System |
| 110 | Sonotrode |
| 120 | Anvil |

The invention claimed is:

1. A method for connecting cell outgoing conductors,
wherein a first cell has a first cell outgoing conductor that exits at an exit point and a second cell has a second cell outgoing conductor that exits at an exit point;
wherein each of the first and second cell outgoing conductors has an end section with an upper boundary and a lower boundary, and the end section is located in each case remote from the exit point of the respective cell outgoing conductor, and wherein the lower boundary is closer to the exit point than the upper boundary;
the method which comprises the following steps:
arranging the first and the second cell such that the first and second cell outgoing conductors extend in a direction of a first axis and are at a mutually spaced disposition;
positioning a first component of a connecting apparatus against the first cell outgoing conductor, the first component being capable of moving in a direction of a second axis; and
positioning a second component of the connecting apparatus against the second cell outgoing conductor, with the first and second cell outgoing conductors positioned, as seen along the second axis, between the first and second components;
ensuring that a bending aid is positioned between the first and second cell outgoing conductors at least while performing a portion of a step of pushing the first cell outgoing conductor in a direction towards the second cell outgoing conductor with the first component and in pushing the second cell outgoing conductor in a direction towards the first cell outgoing conductor by moving the second component or by moving the first and second cells in the direction towards the second component, whereby the first and second cell outgoing conductors are bent at the respective exit point; and
removing the bending aid from between the first and second cell outgoing conductors and subsequently producing a connection between the first and second cell outgoing conductors by pushing the end sections against each other by way of the first and second components while subjecting the end sections to energy, and, during the process of connecting the end sections, forming a bend in the first and second cell outgoing conductors at the respective lower boundary.

2. The method according to claim 1, wherein the second axis includes a horizontal component.

3. The method according to claim 2, wherein the second axis extends horizontally.

4. The method according to claim 1, wherein the connection is a cohesive connection between the parts.

5. The method according to claim 1, wherein the connecting apparatus comprises an ultrasound welding device and the first component includes a sonotrode and the second component includes an anvil.

6. The method according to claim 1, wherein the bending aid is bar-shaped or T-shaped.

7. The method according to claim 1, which comprises, after the end sections of the first and second cell outgoing conductors are connected, folding over the cell outgoing conductors along the lower boundary thereof.

8. The method according to claim 1, which comprises covering the mutually connected first and second cell outgoing conductors with a cover.

9. The method according to claim 1, wherein the first and second cells are in each case a battery cell or a battery.

10. The method according to claim 9, wherein the first and second cell outgoing conductors are metallic sheet outgoing conductors.

11. The method according to claim 1, wherein the first and second cell outgoing conductors are metallic sheet outgoing conductors.

* * * * *